May 6, 1924.
R. ADAMSON
RAILWAY LOCOMOTIVE
Filed May 22, 1922
1,492,915
2 Sheets-Sheet 2
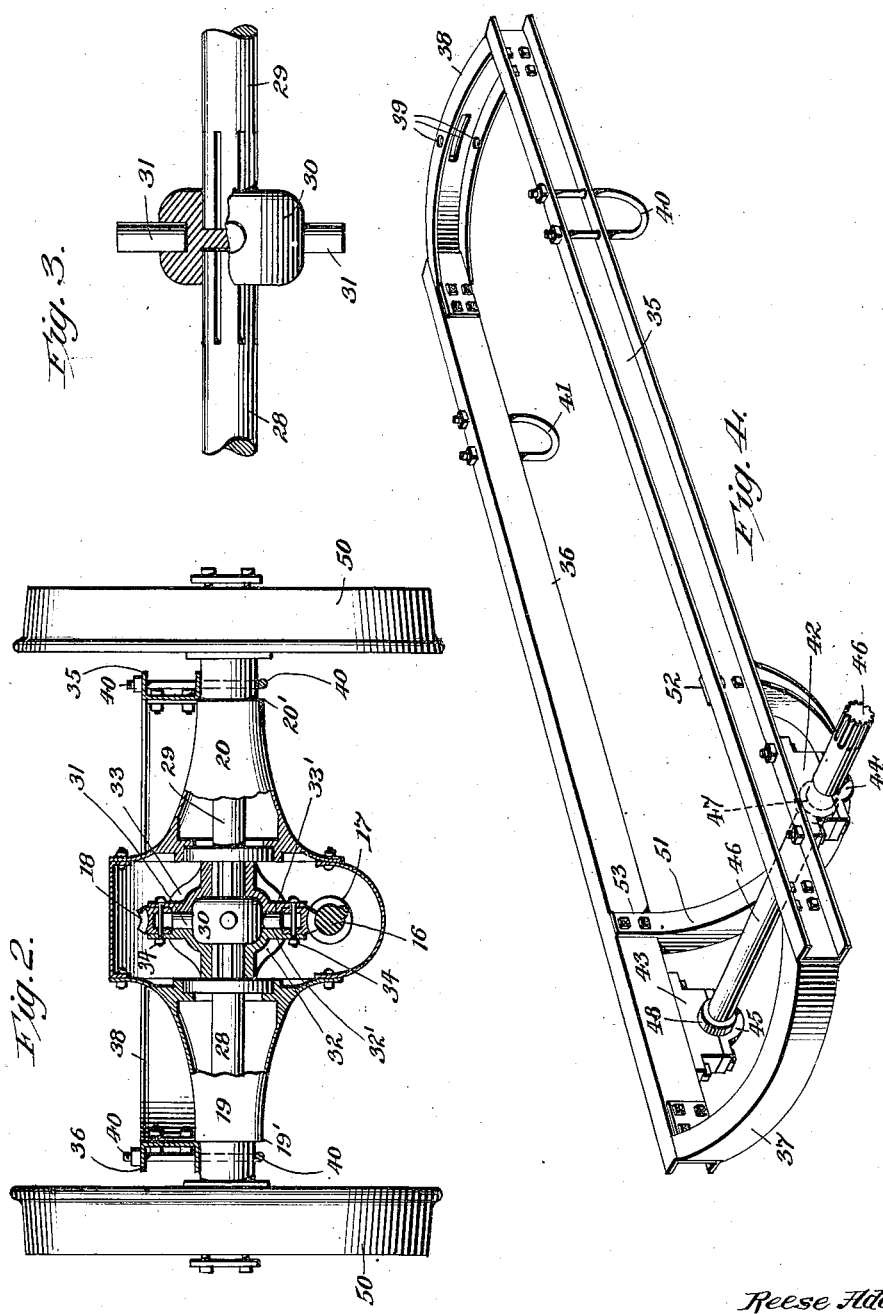
Inventor:
Reese Adamson,
By Dodge and Sons,
Attorneys Patented May 6, 1924.

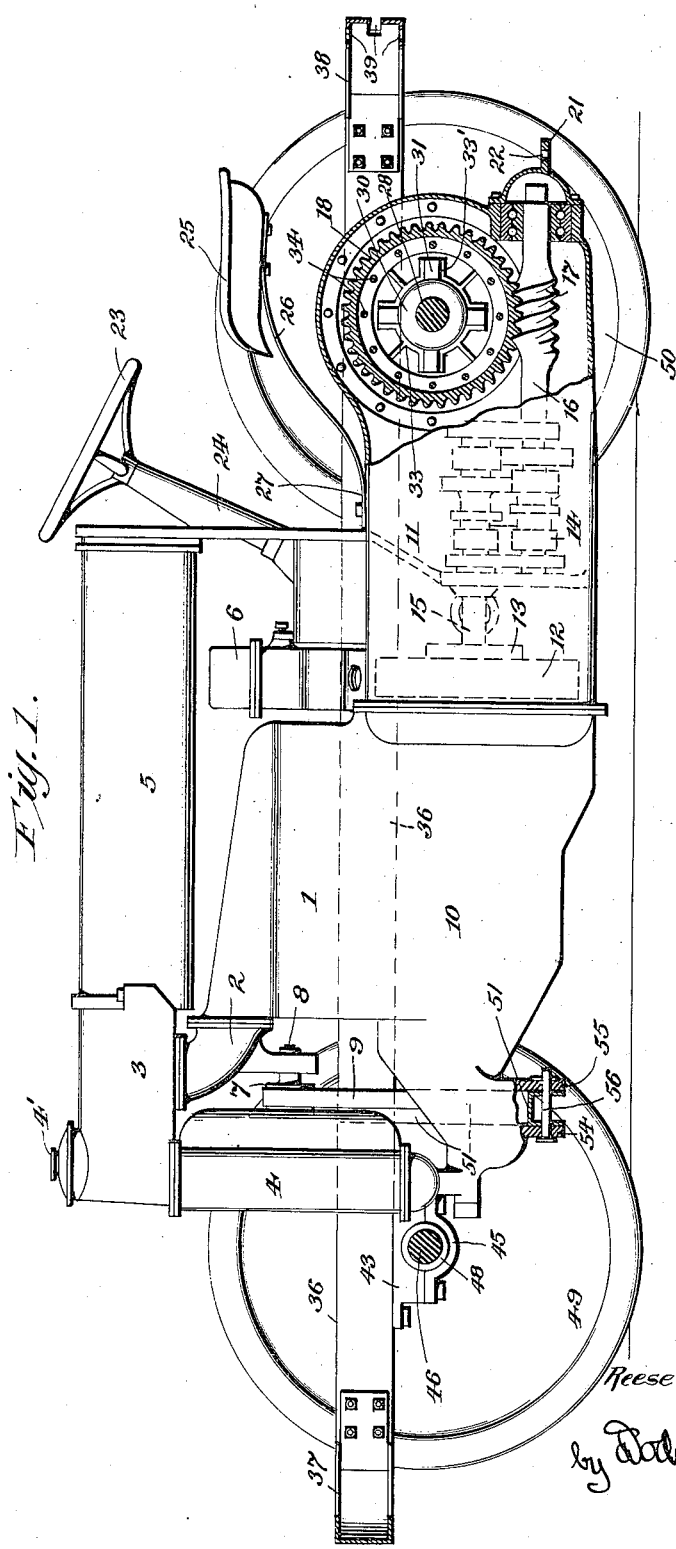

1,492,915

UNITED STATES PATENT OFFICE.

REESE ADAMSON, OF BIRMINGHAM, ALABAMA.

RAILWAY LOCOMOTIVE.

Application filed May 22, 1922. Serial No. 562,822.

*To all whom it may concern:*

Be it known that I, REESE ADAMSON, a citizen of the United States, residing at Birmingham, in the county of Jefferson and State of Alabama, have invented certain new and useful Improvements in Railway Locomotives, of which the following is a specification.

The present invention relates to railway locomotives which utilize an internal combustion engine as the source of power to drive the traction wheels of the locomotive.

The primary object of the invention is the provision of a railway truck attachment particularly designed for use with the tractor commercially known as the Fordson to form, either permanently or temporarily as desired, a locomotive adapted to be propelled by the tractor motor. Such a locomotive, it may readily be seen, is particularly desirous for use in hauling cars in mines, quarries, brick yards, saw mills, and in numerous other industries.

It is also the purpose of the invention to provide a railway truck attachment of the type mentioned which, when combined with a Fordson, or other similar tractor or device, requires a minimum number of changes in the latter, so that, if desired, the use of the tractor as a railway locomotive may be only temporary and it may readily be converted back into its normal tractor form.

A further object is to provide means whereby the two separate rear axle driveshafts of the Fordson, or such other tractor as may be used, may be rigidly connected together for a joint non-differential drive of the rear or driving wheels of the locomotive when the several parts are assembled. The truck attachment is of sufficiently rugged construction to amply withstand all of the strains and stresses to which it may be subjected when in actual use. The connections between the railway truck and the tractor body are also designed to distribute the shocks and strains, to which the truck is subjected, to the less rugged parts of the tractor body without likelihood of damage to the latter.

Although the Fordson is the particular tractor for which the present attachment is designed, it is to be understood, of course, that with obvious changes in the sizes and perhaps the shapes of certain parts of the truck attachment, it may readily be combined with any other similar tractor or device of this nature.

In a practical form of the invention, which has been in actual use, the Fordson tractor is converted into a railway locomotive by first removing all four wheels of the tractor, the bevel pinions of the tractor differential, the front axle, and the parts of the tractor's steering gear which are directly associated with the front axle, together with the rearwardly extending connecting rod which normally serves, through the operation of the tractor's steering wheel, to actuate parts of the steering mechanism which are removed. Since the locomotive is to be run on rails and there is no need of the tractor's rear axle differential, after removal of the bevel pinions of the differential, the inner adjoining ends of the two rear axle shafts and the ring worm-wheel of the tractor are all rigidly connected together in any suitable manner so that upon rotation of the ring worm-wheel by the worm on the transmission shaft of the tractor, both parts of the rear axle will turn together and operate as a single unitary axle to rotate the rear drive wheels of the locomotive which are mounted on the outer ends thereof. The truck frame surrounds the tractor and is of substantially rectangular shape. Preferably it is made of heavy channel bars bolted together at the several corners of the frame. Both ends of the truck frame extend beyond the car wheels of the locomotive in order to serve as bumpers and also so that they may receive suitable devices for coupling the locomotive to cars. The side members of the truck frame at its rear end rest on the upper faces of the rear axle housing parts of the tractor and are securely bolted thereto. At its forward end the side members of the truck frame are provided with suitable journals in which the front axle of the locomotive is removably mounted, the outer ends of this axle having secured thereon the front railway wheels of the locomotive. The forward end of the tractor is supported within the truck frame by means of a cradle member located near the front end of the truck frame and rigidly connected thereto so as to practically form an integral part of the truck.

Other features of construction and arrangement of the parts of the locomotive will appear from the accompanying drawings and the detailed description given hereinafter.

In the drawings, which illustrate a practical embodiment of the invention as actually used, like reference numerals indicate the same parts throughout the several views.

Figure 1 is a side elevation of a Fordson tractor combined with the specially designed railway truck as contemplated by the invention. The truck is shown in longitudinal section and certain of the rear parts of the tractor are broken away in order to more clearly disclose the arrangement of the tractor within the truck and the relative positions of the several parts thereof;

Fig. 2, a rear elevation of the locomotive disclosing the manner in which the truck frame is mounted on and connected to the rear axle housing parts. Certain parts of the tractor are broken away in order to show the manner in which the rear axle shafts of the tractor may be coupled together for non-differential drive of the rear wheels of the locomotive;

Fig. 3, an enlarged fragmentary side elevation of the connection between the rear axle shafts of the tractor as shown in Fig. 2; and Fig. 4, a perspective view of the truck frame alone, showing the manner in which the front axle of the locomotive is mounted in the truck frame, and also the cradle member secured to the forward part of the truck frame to receive and support the front end of the tractor body.

Referring to Fig. 1 of the drawings, 1 represents the water-jacketed motor of the tractor; 2 is the connection between the water-jacket of the motor 1 and top tank 3 of radiator 4; and 4' is the radiator cap. The fuel tank is shown at 5; the air-washer at 6; the fan pulley at 7; the fan shaft at 8; and the fan belt at 9.

As shown in the drawings, the main body of the tractor comprises the internal-combustion motor 1; the crank case 10; the rear housing 11, which encloses, principally, fly wheel 12, clutch 13, transmission gearing 14, upper transmission shaft 15, lower transmission shaft 16, provided with worm 17, and worm-wheel 18; and the two parts 19, 20 of the rear axle housing. The draw-bar cap 21 of the tractor is attached to the rear end of housing 11 and is provided with a vertical opening or openings 22 for the attachment of apparatus to be drawn by the tractor as, for instance, a plow or harrow.

The steering-wheel of the Fordson is shown at 23 on the upper end of the post 24 through which its steering shaft passes. The seat for the operator of the locomotive is shown at 25, the same being secured on the upper end of a spring member 26, which is bolted at its lower end 27 to housing 11.

Since, as stated, the locomotive is intended to operate on rails, the means for permitting differential rotation of the rear axle shafts of the tractor is done away with by removing the bevel pinions of the differential mechanism. The rear axle shafts 28, 29 of the tractor are then joined together so as to constitute what is in effect a single, unitary rear axle by casting a connecting member or spider-block 30 about the inner, adjoining, fluted ends of the two shafts, as shown in detail in Fig. 3. Spider-block 30 is also cast with a series of radially projecting pins 31 thereon. The original differential housing members 32, 33 of the tractor, having corresponding series of concave seats 32', 33', respectively, enclose ring worm-wheel 18 and surround spider-block 30 with pins 31 resting in the series of seats 32', 33'. Suitable bolts 34 secured in openings provided therefor in ring worm-wheel 18 and differential housing members 32, 33 serve to clamp the several parts rigidly together so that, upon rotation of worm-wheel 18, rear axle shafts 28, 29 will be rotated as a unit through the several parts just described.

The special truck frame within which the tractor body is located comprises, principally, the side frame members 35, 36 and the end bumper members 37, 38, sometimes termed yokes, all of which are suitably bolted together at their points of connection at the corners of the truck. Preferably these frame members are formed of channel sections sufficiently heavy to withstand the hard usage to which the locomotive is subjected in hauling and coupling and uncoupling cars. In the preferred embodiment of the invention, the several members forming the truck frame, when made of channel sections, are connected at the corners of the frame in the manner shown in the drawings, that is, by cutting away portions of the flanges of the end bumper members 37, 38 near their ends, bending the projecting web portions thus provided into line with the inner faces of the side frame members 35, 36 and bolting these parts together, as clearly shown in Fig. 4. At the center of the rear bumper member 38 of the truck frame there are provided suitable means, such, for instance, as openings 39 for attachment of the usual coupling members of the cars to be drawn by the locomotive.

As heretofore stated, the side members 35, 36 of the truck frame near their rear ends rest upon the upper faces of the rear axle housing parts 19, 20, respectively, of the tractor, the width of the truck frame being such that the inner faces of side frame members 35, 36 abut against the shoulders 19', 20' formed on the rear axle housing parts 19, 20, respectively, thus preventing possible transverse shifting of the frame relative to the tractor. In order to connect the rear end of the truck frame rigidly to the tractor and thereby prevent looseness or undue vibration between the parts of the tractor and those of the truck frame, large U-bolts 40, 41 are provided for side frame members 35, 36, respectively. Each of these U-bolts is adapted, as shown in Fig. 2, to be passed up around the rear axle housing parts 19, 20 of the tractor and through suitable perforations provided therefor in the flanges of side frame members 35, 36 and nuts secured on their upper threaded ends in order to firmly clamp the side frame members 35, 36 to the rear axle housing members 19, 20, respectively, and, together with shoulders 19', 20', prevent relative movement of the parts.

At its forward end, the truck frame is provided with upper journal members 42, 43 bolted to the lower faces of the side frame members 35, 36, respectively. Mounted in these upper journal members and secured thereto by means of lower journal members 44, 45, removably connected by suitable means to the upper journal members, is the front axle 46 of the locomotive. Axle 46 is provided with fixed collars 47, 48 in order to prevent transverse shifting of the axle within its bearings.

Rigidly secured in any suitable manner to the outer ends of the front axle 46 are the front wheels 49, 49 of the locomotive, while to the outer ends of the rear driving axle of the locomotive, which latter, as stated, consists of the two rigidly connected rear axle shafts 28, 29 of the tractor, are secured the driving wheels 50, 50 of the locomotive.

Located at the forward end of the truck frame slightly to the rear of front axle 46, is a U-shaped cradle member 51 which is rigidly secured at its extremities to the side frame members 35, 36 of the truck frame. Cradle member 51 is adapted to receive and support the front end of the tractor body in the truck frame. Preferably cradle member 51 is formed of a channel section with the flanges thereof on the under side. In the construction shown in the drawings, portions of the flanges of member 51 near its extremities are cut away so as to leave projecting web portions 52, 53, which are suitably secured to side frame members 35, 36, respectively, as by bolting, so that cradle member 51 is rigidly attached to the truck frame.

Located on the under side of crank case 10 of the Fordson tractor near the forward end thereof is a pair of depending, perforated lugs 54, 55 which, when the tractor is used as such, receives the trunnion pin 56, the latter also passing through the front axle of the tractor and thereby pivotally supporting the body of the tractor on its front axle. When converted into a locomotive, as embodied by the present invention, the front axle of the tractor is removed, as heretofore stated, together with trunnion pin 56. The forward portion of crank case 10 of the tractor body then rests on the central portion of the upper face of cradle member 51 with depending lugs 54, 55 extending down on either side of member 51. The tractor body and member 51 are securely connected together at this point by means of the tractor trunnion pin 56 which passes through and is secured in perforated lugs 54, 55 and registering perforations provided in the flanges of member 51.

Thus it will be seen, the tractor body and the truck frame are rigidly connected together so as, in effect, to form practically a single unitary structure adapted to withstand the jars to which the locomotive is subjected with small likelihood of damage to the parts of the tractor.

Although the invention, as stated among the principal objects sought to be accomplished, and as illustrated in the drawings and more particularly described above, makes use of the Fordson tractor as the vehicle with which the specially designed railroad truck is combined, it is not intended that the invention be limited to a locomotive of which this particular tractor, or rather such parts thereof as are used, forms a part. A feature, or features, of the invention, it is contemplated, might well be adapted for use in a locomotive of the character described having any other suitable tractor, or similar vehicle, forming an element of the combination. Necessary changes may be made for this purpose without departing from the spirit of the present invention.

The terms "vehicle body" or "tractor body" as used in the appended claims refer to the engine 1, crank case 10, rear housing 11, and rear axle housing sections 19, 20 of the Fordson tractor, these being the parts of the tractor which in general form the main body or frame of the tractor. These terms are used, however, in their broad sense and are intended to include the main body or frame of any type of tractor or other vehicle which may be used irrespective of what parts thereof go to make up the main body or frame of the vehicle.

What I claim is:—

1. A tractor, adapted for mounting on a railway truck, having its rear tractor wheels removed and replaced by car wheels, and having its rear axles coupled for a joint non-differential drive of said car wheels.

2. A tractor, adapted for mounting on a railway truck, having its rear tractor wheels removed and replaced by car wheels, and having metal cast about the inner ends of its rear axles whereby the axles are coupled for a joint non-differential drive of said car wheels.

3. A locomotive of the character described comprising in combination, a tractor body, including a motor; a driving axle mounted in said tractor body; driving means connecting the motor and said driving axle; a truck frame within which said tractor body is located; means for supporting one end of the tractor body in said truck frame; an axle mounted in said truck frame; means for securing the opposite end of the tractor body to the truck frame; and railway car wheels mounted on said truck axle and said driving axle.

4. The combination in a locomotive of the character described, of a tractor body, including a motor and a rear axle housing; a driving axle mounted in said rear axle housing; driving means connecting the motor and said driving axle; a truck frame within which the tractor body is located, the rear end of said frame being mounted on the rear axle housing of said tractor body; means for supporting the front end of said tractor body in the truck frame; a front axle for said truck frame; and railway car wheels mounted on said front axle and said rear driving axle.

5. The combination with the body of a tractor of the character described including a rear axle housing, of a truck frame within which said tractor body is located; means for supporting the front end of the tractor body within said truck frame; means for clamping the sides of said truck frame on the outer portions of the rear axle housing of the tractor body; an axle mounted in said rear axle housing; a front axle for said truck frame; and railway car wheels mounted on said front and rear axles.

6. The combination with the body of a tractor of the character described including a rear axle housing, of a truck frame within which said tractor body is located, the front end of said tractor body being supported by the front end of said truck frame while the rear end of the truck frame is supported by said tractor body; an axle mounted in said rear axle housing; a front axle for said truck frame; and railway car wheels mounted on said front and rear axles.

7. A truck frame for attachment to a tractor body of the character described comprising a front bumper yoke; a rear bumper yoke; a pair of side frame members connected at their ends to said bumper yokes, each of said side frame members being provided with means to receive one of the outer ends of the rear axle housing of the tractor body; and means for supporting the front end of the tractor in the frame.

8. A truck frame for attachment to a tractor body of the character described comprising a front bumper; a rear bumper; a pair of side frame members connected at their ends to said bumpers, each of said side frame members being provided with means to receive one of the outer ends of the rear axle housing of the tractor body; and means for supporting the front end of the tractor in the frame.

9. The combination of a railway truck frame; a tractor body including a motor, located within and connected to said truck frame so as to form therewith a substantially unitary structure; a front axle for the truck frame; a driving axle mounted in said tractor body; driving means connecting the motor and said driving axle; and car wheels mounted on the ends of the driving axle and the front axle of the truck frame.

10. A truck frame for attachment to a tractor body of the character described comprising a front bumper; a rear bumper; a pair of side frame members connected at their ends to said bumpers; depending U-bolts on each of said side frame members near the rear ends thereof to receive and clamp said frame to the rear axle housing parts of the tractor body; and a transverse cradle member connecting said side frame members near their forward ends and adapted to support the forward end of the tractor body in the frame.

11. A locomotive of the character described comprising in combination a tractor body, including a motor; a driving axle mounted in said tractor body, said axle comprising the rear axle driving shafts of the tractor coupled for a joint non-differential drive; driving means connecting the motor and said driving axle; a truck frame within which said tractor body is located; a cradle member connecting the side members of the truck frame at their forward ends, the forward end of the tractor body being supported in the truck frame by said cradle member; an axle mounted on the forward end of said truck frame; means for clamping the side members of the truck frame to the upper faces of the rear axle housing parts of the tractor body; and railway car wheels mounted on said truck axle and said driving axle.

In testimony whereof I have signed my name to this specification.

REESE ADAMSON.